(12) United States Patent
Van Dun

(10) Patent No.: US 9,658,807 B2
(45) Date of Patent: May 23, 2017

(54) PRINTING SYSTEM AND METHOD FOR PROOF PRINTING ON SAID PRINTING SYSTEM

(71) Applicant: Océ-Technologies B.V., Venlo (NL)

(72) Inventor: Josephus A. M. Van Dun, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/137,795

(22) Filed: Apr. 25, 2016

(65) Prior Publication Data
US 2016/0328191 A1 Nov. 10, 2016

(30) Foreign Application Priority Data

May 5, 2015 (EP) .................................... 15166356

(51) Int. Cl.
*G06F 3/12* (2006.01)
*H04N 1/00* (2006.01)
*G06K 15/02* (2006.01)

(52) U.S. Cl.
CPC ............ *G06F 3/1256* (2013.01); *G06F 3/126* (2013.01); *G06F 3/1211* (2013.01); *G06F 3/1217* (2013.01); *G06F 3/1258* (2013.01); *G06F 3/1268* (2013.01); *G06F 3/1275* (2013.01); *G06F 3/1285* (2013.01); *H04N 1/00405* (2013.01)

(58) Field of Classification Search
None
See application file for complete search history.

(56) References Cited

U.S. PATENT DOCUMENTS

| 5,164,842 | A | * | 11/1992 | Gauronski | H04N 1/00002 358/296 |
| 5,367,673 | A | * | 11/1994 | Goldsmith | H04N 1/6011 358/534 |
| 5,436,730 | A | * | 7/1995 | Hube | G06F 3/1297 358/1.16 |
| 2002/0161831 | A1 | * | 10/2002 | Nakaoka | G06F 3/1204 709/203 |
| 2002/0180822 | A1 | * | 12/2002 | Aritomi | G06K 15/02 347/19 |

(Continued)

*Primary Examiner* — Beniyam Menberu
(74) *Attorney, Agent, or Firm* — Birch, Stewart, Kolasch & Birch, LLP

(57) ABSTRACT

The invention relates to a printing system comprising a print job receiving section permitting a user to submit a print job to the printing system, the print job comprising a plurality of print job settings comprising a proof print job setting indicating whether or not the print job needs to be proofed before printing, a control unit for controlling a print job queue for print jobs submitted to the printing system and scheduled to be printed, a user interface configured to display the print job queue, wherein the user interface is configured to display a digital user operable item for a print job in the print job queue, the print job having a proof print job setting indicating that the print job needs to be proofed before printing, and wherein the control unit is configured to schedule a proof print job corresponding to the print job in the print job queue before the print job upon activation of the digital user operable item, and to print the proof print job according to the print job queue.

14 Claims, 6 Drawing Sheets

(56) References Cited

U.S. PATENT DOCUMENTS

| | | | |
|---|---|---|---|
| 2004/0099166 A1 | 5/2004 | Blom et al. | |
| 2005/0243365 A1* | 11/2005 | Noda | G06F 3/1262 358/1.15 |
| 2006/0274354 A1 | 12/2006 | Farrell | |
| 2007/0242962 A1* | 10/2007 | Yamamoto | G03G 15/50 399/15 |
| 2008/0168450 A1* | 7/2008 | Tarumi | G06Q 10/00 718/102 |
| 2009/0122346 A1* | 5/2009 | Kamata | G06K 15/025 358/1.16 |
| 2010/0238512 A1* | 9/2010 | Kimura | G06F 3/1222 358/3.24 |
| 2012/0194860 A1* | 8/2012 | Anno | B41J 29/393 358/1.15 |
| 2015/0138596 A1* | 5/2015 | Kikuchi | G06F 3/1203 358/1.15 |

\* cited by examiner

PRINTING SYSTEM AND METHOD FOR PROOF PRINTING ON SAID PRINTING SYSTEM

FIELD OF THE INVENTION

The present invention relates to a printing system comprising a print job receiving section permitting a user to submit a print job to the printing system, the print job comprising a plurality of print job settings comprising a proof print job setting indicating whether or not the print job needs to be proofed before printing, and a control unit for controlling a print job queue for print jobs submitted to the printing system and scheduled to be printed.

The present invention also relates to a method for printing a print job by means of the printing system comprising a control unit for controlling a print job queue and a user interface for displaying the print job queue, the print job comprising a plurality of print job settings comprising a proof print job setting indicating that the print job needs to be proofed before printing, the method comprising the step of receiving the print job in the print job queue.

The present invention further relates to a recording medium comprising computer executable program code configured to instruct a computer to perform a method according to the invention on a printing system according to the invention.

BACKGROUND OF THE INVENTION

In a printing system a print job queue exist. The print job queue is an ordered queue of print jobs which are scheduled to be printed on the printing system. The ordering of the queue may be according to an ordering criterion defaulted for the printing system. An ordering criterion may be a first in first out ordering. Print jobs are submitted to the printing system. A typical print job has print job settings describing the print job and used during printing of the print job to set printing parameters of the printing system. One of the print job settings of a print job may be a proof print job setting indicating whether or not the print job needs to be proofed before printing. When a print job needs to be proofed before printing the actual print job, a proof print job will be created and printed. A proof print job is a trial print job on at least one sheet in order to check and/or correct corresponding print job settings before producing a copy or a number of copies of the print job.

Nowadays a proof print job is printed and proofed. After the proofing the corresponding print job is scheduled at the end of the print job queue and printed when the print job reaches the head of the print job queue. This way of working is not very productive since printing stops when the proof print job is proofed and there may be a superfluously large time between proofing of the proof print job and printing of the corresponding print job.

According to other prior art a print job is scheduled and labeled to be proofed. When the print job arrives at the head of the print job queue, the proof print job is printed, the printing system stops printing and the proof print has to be checked. When the check is done and positive, the printing system resumes printing, i.e. with printing of the print job. This way of working comprises a print stop and leads to a reduction of the productivity of the printing system.

It is an objective of the present invention to provide a printing system that permits to increase productivity of the printing system with regard to proof print jobs.

SUMMARY OF THE INVENTION

In order to achieve this objective, according to the present invention, the control unit is configured to check the proof print job setting of a print job to be scheduled or already scheduled in the print job queue, to schedule, upon a positive check, a proof print job corresponding to the print job in the print job queue before the print job, and to print the proof print job according to the print job queue before the processing of the print job.

By doing so the proof print job is scheduled in the print job queue before the corresponding print job and will also be printed before the printing of the corresponding print job. This means that there is a substantive amount of time left between printing of the proof print job and the corresponding print job. The substantive amount of time may be used to check the print quality of the proof print job. If the print quality of the proof print job is according to the wishes of the operator or the client, the quality check is positively confirmed and the corresponding print job can be printed immediately when it arrives at the head of the print job queue.

According to an embodiment the printing system comprises a user interface configured to display the print job queue, wherein the user interface is configured to display a digital user operable item for a print job in the print job queue, if the print job has a proof print job setting indicating that the print job needs to be proofed before printing, and the control unit is configured to schedule a proof print job corresponding to the print job in the print job queue before the print job upon activation of the digital user operable item. The digital user operable item may be a well known digital user operable item like a software button, an activatable digital thumbnail image or a clickable digital icon.

According to an embodiment the user interface is configured to display the digital user operable item before arrival of the print job at the head of the print job queue. The digital user operable item is displayed before the arrival of the print job at the head of the print job queue in order to give the operator the opportunity to proof the proof print job before the actual printing of the print job.

According to an embodiment the user interface is configured to display the digital user operable item upon entry of the print job in the print job queue. This is advantageous since by doing so the operator is able to notice the digital user operable item from the earliest available time namely the introduction of the print job in the print job queue.

According to an embodiment, upon activation of the digital user operable item, the proof print job is scheduled at the head of the print job queue. By scheduling the proof print job at the head of the print job queue, the proof print job will be immediately printed if there is no current print job or will be printed immediately after the current print job. By doing so, the period for proofing is as large as possible.

According to an embodiment the control unit is configured to gradually change at least one characteristic of the digital user operable item in order to indicate a time left for proofing the print job before the printing of the print job. The time left is important since the time left has to be sufficient to check and approve the proof print job before the print job arrives at the head of the print queue.

According to an embodiment the at least one characteristic of the digital user operable item is at least one of a colour, a pattern, a text, a visibility frequency, a size and a shape of the digital user operable item.

According to an embodiment the control unit is configured to detect a touch or mouse click at a position on the user interface after activation of the digital user operable item, the position being a position in a representation of the print job queue on the user interface, and, upon the touch or the mouse click, to schedule the print job in the print job queue corresponding to the touched position. This way of working gives a large flexibility to the operator or user to schedule the proof print job in the print job queue.

The user interface may be a touch screen sensible for touches initiated by the operator or user or another mouse device capable screen usable for clicking by means of a mouse device on the appropriate position in the representation of the print job queue at the user interface.

According to an embodiment the control unit is configured to move the print job to a proof print job queue and/or to remove the print job from the print job queue when the print job arrives at the head of the print job queue which print job comprises a proof print job setting indicating that the print job needs to be proofed before printing and the digital user operable item corresponding to the print job is not activated at the user interface before arrival of the print job at the head of the print job queue. In order to keep the printing system running, the print job which arrives at the head of the print job queue and which has not been proofed, is preferably diverted to another print job queue, for example a proof print job queue, or removed from the print job queue.

According to an embodiment the control unit is configured to display, upon activation of the digital user operable item, a menu of options of how and where to add the proof print job to the print job queue. The menu of options may be opened in the same or another window than the window which comprises the representation of the print job queue at the user interface. The menu may contain the options of how and where to add the proof print job to the print job queue as have been mentioned in the embodiments of the printing system described here-above.

According to an embodiment wherein the print job has another proof print setting indicating whether or not a proof print job needs to be printed immediately upon entry of the print job at a tail of the print job queue, and the control unit is configured to check the other proof print job setting of a print job to be scheduled in the print job queue, and to schedule the print job at the tail of the print job queue, and to schedule, if the check of the other proof print setting is positive, a proof print job corresponding to the print job at a head of the print job queue upon entry of the print job at the tail of the print job queue. The other digital user operable item may be near the digital user operable item which is initially activated in order to schedule the proof print job in the print job queue. As soon as the proof print job is checked and approved, the corresponding print job can immediately be printed when the print job arrives at the head of the print job queue.

According to an embodiment the print job has another proof print setting indicating whether or not a proof print job needs to be printed immediately upon entry of the print job at a tail of the print job queue, and the control unit is configured to check the other proof print job setting of a print job to be scheduled in the print job queue, and to print the proof print job immediately as a print job interrupting a current print job.

According to an embodiment the print job queue is ordered according to at least one print job criterion and the control unit is configured to schedule the proof print job at a moment in time that is in accordance with the at least one print job criterion. In order to not cause an unnecessary disturbance of the ordering of the print job queue according to the at least one print job criterion, the proof print job is automatically scheduled in the print job queue at a moment which is in accordance with the at least one print job criterion.

For example, if the print job criterion is base on a minimum of media changes, the proof print job may be scheduled before or after a print job which needs the same media as the proof print job. For example, if the print job criterion is based on print deadlines, the proof print job may be scheduled at such a moment in the print job queue that the deadlines for the print jobs already scheduled in the print job queue are still met. For example, if the print job criterion is based on the use of print modes, the proof print job may be scheduled before or after a print job which uses the same print mode as the proof print job.

According to an embodiment the control unit is configured to change at least one visual characteristic of the digital user operable item at the moment in time that is in accordance with the at least one print job criterion. By noticing the change of the at least one visual characteristic of the digital user operable item, the operator or user is triggered that this moment is suitable for inserting a proof print job corresponding to the print job having its digital user operable item changing.

According to an embodiment the user interface is configured to display another digital user operable item corresponding to a print job in the print job queue which needs to be proofed, the other digital user operable item being suitable for approving of a printed proof print job corresponding to the print job upon activation of the other digital user operable item, and the control unit is configured to print the print job according to the print job queue, when the other digital user operable item is activated before the print job arrives at the head of the print job queue.

According to an embodiment the control unit is configured to move the print job to a proof print job queue and/or to remove the print job from the print job queue, when the other digital user operable item is not activated before the print job arrives at the head of the print job queue. The proof print job has been printed but the proofing of the printed result of the proof print job is still going on. In order to keep the printing system running, the print job which arrives at the head of the print job queue and which has not been proofed yet, is preferably diverted to another print job queue, for example a proof print job queue, or removed from the print job queue.

According to an embodiment the user interface is configured to display the digital user operable item and the other digital user operable item as combined into one digital user operable item, wherein functionality of the digital user operable item and functionality of the second digital user operable item are distinguishable in the one digital user operable item by means of a difference in at least one characteristic of the one digital user operable item.

According to an embodiment the user interface is configured to display a user interface window comprising the print job settings of the print job together with the other digital user operable item.

According to an embodiment the proof print job consist of a single sheet to be printed. The printing time of the proof print job is reduced to a minimum and will barely influence the ready time of the other print jobs in the print job queue.

The present invention also relates to a method for printing a print job by means of a printing system comprising a control unit for controlling a print job queue and a user interface for displaying the print job queue, the print job comprising a plurality of print job settings comprising a proof print job setting indicating whether or not the print job needs to be proofed before printing, the method comprising the steps of receiving the print job in the print job queue, checking the proof print setting of the print job, upon a positive check, scheduling a proof print job corresponding to the print job in the print job queue before the print job, and printing the proof print job according to the print job queue before the processing of the print job.

According to an embodiment of the method the printing system comprises a user interface configured to display the print job queue, and the method comprising the steps of displaying the print job queue, displaying a digital user operable item for a print job at the displayed print job queue, if the print job has a proof print job setting indicating that the print job needs to be proofed before printing, and scheduling the proof print job corresponding to the print job in the print job queue before the print job upon activation of the digital user operable item.

According to an embodiment the method comprises the step of displaying the digital user operable item before arrival of the print job at the head of the print job queue.

According to an embodiment the method comprises the step of displaying the digital user operable item upon entry of the print job in the print job queue.

According to an embodiment the method comprises the step of, upon activation of the digital user operable item, scheduling the proof print job at the head of the print job queue.

According to an embodiment the method comprise the step of changing at least one visual characteristic of the digital user operable item at the moment in time that is in accordance with the at least one print job criterion.

According to an embodiment the method comprises the step of gradually changing at least one visual characteristic of the digital user operable item in order to indicate a time left for proofing the print job before the printing of the print job.

According to an embodiment the at least one visual characteristic of the digital user operable item is at least one of a colour, a pattern, a text, a visibility frequency, a size and a shape of the digital user operable item.

According to an embodiment the method comprises the step of detecting a touch or mouse click at a position on the user interface after activation of the digital user operable item, the position being a position in a representation of the print job queue on the user interface, and, upon the touch or the mouse click, scheduling the print job in the print job queue corresponding to the touched position.

According to an embodiment the method comprises the steps of moving the print job to a proof print job queue and/or removing the print job from the print job queue when the print job arrives at the head of the print job queue which print job comprises a proof print job setting indicating that the print job needs to be proofed before printing and the digital user operable item corresponding to the print job is not activated at the user interface before arrival of the print job at the head of the print job queue.

According to an embodiment the method comprises the step of displaying, upon activation of the digital user operable item, a menu of options of how and where to add the proof print job to the print job queue.

According to an embodiment the print job has another proof print setting indicating whether or not a proof print job needs to be printed immediately upon entry of the print job at a tail of the print job queue, and the method comprises the steps of checking the other proof print job setting of a print job to be scheduled in the print job queue, scheduling the print job at the tail of the print job queue, and scheduling, if the check of the other proof print setting is positive, a proof print job corresponding to the print job at a head of the print job queue upon entry of the print job at the tail of the print job queue.

According to an embodiment the print job has another proof print setting indicating whether or not a proof print job needs to be printed immediately upon entry of the print job at a tail of the print job queue, and the method comprises the steps of checking the other proof print job setting of a print job to be scheduled in the print job queue, and printing the proof print job immediately as a print job interrupting a current print job.

According to an embodiment the print job queue is ordered according to at least one print job criterion and the method comprises the step of scheduling the proof print job at a moment in time that is in accordance with the at least one print job criterion.

According to an embodiment the method comprises the step of displaying another digital user operable item corresponding to a print job in the print job queue which needs to be proofed, the other digital user operable item being suitable for approving of a printed proof print job corresponding to the print job upon activation of the other digital user operable item, and printing the print job according to the print job queue, when the other digital user operable item is activated before the print job arrives at the head of the print job queue.

According to an embodiment the method comprises the steps of moving the print job to a proof print job queue and/or removing the print job from the print job queue, when the other digital user operable item is not activated before the print job arrives at the head of the print job queue.

According to an embodiment the method comprises the step of displaying the digital user operable item and the other digital user operable item as combined into one digital user operable item, wherein functionality of the digital user operable item and functionality of the second digital user operable item are distinguishable in the one digital user operable item by means of a difference in at least one characteristic of the one digital user operable item.

According to an embodiment the method comprises the step of displaying a user interface window comprising the print job settings of the print job together with the other digital user operable item.

According to an embodiment the proof print job consist of a single sheet to be printed.

The present invention also relates to a recording medium comprising computer executable program code configured to instruct a computer to perform a method according to the invention on a printing system according to the invention.

BRIEF DESCRIPTION OF THE DRAWINGS

Preferred embodiments will now be described in conjunction with the drawings, wherein.

DETAILED DESCRIPTION OF EMBODIMENTS

Figure 1:
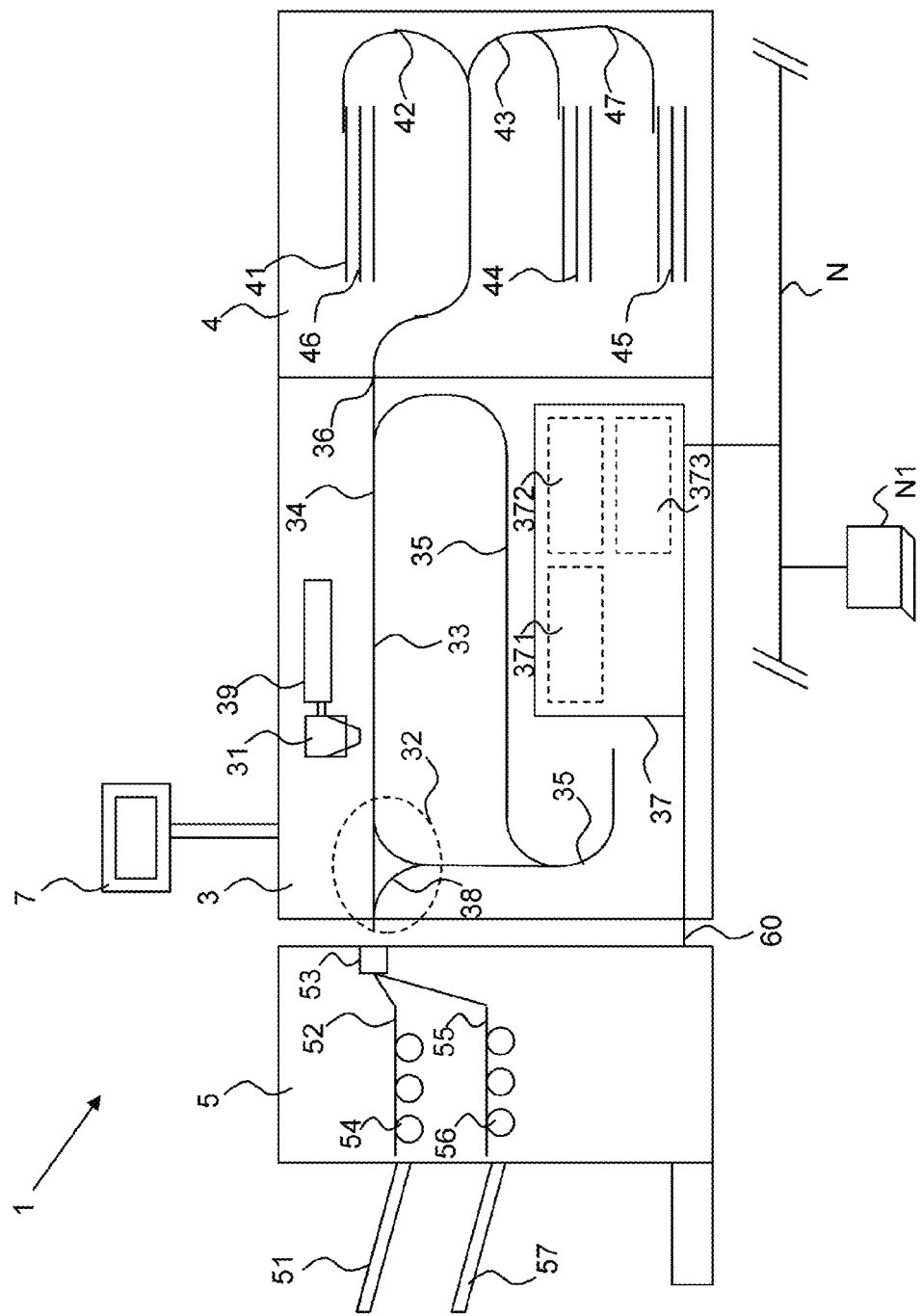
FIG. 1 is a schematic view of the printing system according to the invention.

FIG. 1 shows schematically an embodiment of a printing system 1 according to the invention. The printing system 1, for purposes of explanation, is divided into an output section 5, a print engine and control section 3, a local user interface 7 and an input section 4. While a specific printing system is shown and described, the disclosed embodiments may be used with other types of printing system such as ink jet, electrographic, etc.

The output section 5 comprises a first output holder 52 for holding printed image receiving material. In an embodiment the output section 5 comprises a second output holder 55 for holding printed proof prints. The printed image receiving material is transported from the print engine and control section 3 via an inlet 53 to the output section 5. When a stack ejection command is invoked by the control unit 37 for the first output holder 52, first guiding means 54 are activated in order to eject the stack on the first output holder 52 outwards to a first external output holder 51. The operator can take the stack from the first external output holder 51 for further processing the outputted documents in the stack. When a stack ejection command is invoked by the control unit 37 for the second output holder 55, second guiding means 56 are activated in order to eject the one or more proof prints on the second output holder 55 outwards to a second external output holder 57. The operator can take the one or more proof prints from the second external output holder 57 for further processing, for example an assessment of the one or more proof prints leading to an approval or a disapproval of the one or more proof prints.

Finishing equipment may be added to or replace the first external holder 51 for further finishing the ejected stack. The first internal output holder 52 may not be reachable by an operator. In the latter case the operator cannot take the stack from the first internal output holder 52 for further processing, but he can only take the stack from the first external output holder 51 for further processing. The second internal output holder 55 may not be reachable by an operator. In the latter case the operator cannot take the one or more proof prints from the internal output holder 55 for further processing, but he can only take the one or more proof prints from the second external output holder 57 for further processing.

The output section 5 is digitally connected by means of a cable 60 to the print engine and control section 3 for bi-directional data signal transfer.

The print engine and control section 3 comprises a print engine and a control unit 37 for controlling the printing process. The control unit 37 is a computer, a server or a workstation, connected to the print engine and connected to the digital environment of the printing system, for example a network N for transmitting a submitted print job to the printing system 1. In FIG. 1 the control unit 37 is positioned inside the print engine and control section 3, but the control unit 37 may also be positioned outside the print engine and control section 3 in connection with the network N in a workstation N1.

The control unit 37 comprises a print job receiving section 371 permitting a user to submit a print job to the printing system 1, the print job comprising image data to be printed and a plurality of print job settings.

The control unit 37 comprises a print job queue section 372 comprising a print job queue for print jobs submitted to the printing system 1 and scheduled to be printed.

The control unit 37 comprises a system settings section 373 configured to maintain system settings of the printing system 1. One of the system settings may be at least one system setting for a print job criterion according to which the print job queue is ordered. A proof print job may be scheduled at a moment in time—meaning a position in the print job queue—that is in accordance with the at least one print job criterion. In order to not cause an unnecessary disturbance of the ordering of the print job queue according to the at least one print job criterion, the proof print job is scheduled in the print job queue at a moment which is in accordance with the at least one print job criterion. For example, if the print job criterion is base on a minimum of media changes, the proof print job may be scheduled before or after a print job which needs the same media as the proof print job. For example, if the print job criterion is based on print deadlines, the proof print job may be scheduled at such a moment in the print job queue that the deadlines for the print jobs already scheduled in the print job queue are still met. For example, if the print job criterion is based on the use of print modes, the proof print job may be scheduled before or after a print job which uses the same print mode as the proof print job.

Resources for the printing system 1 may be recording material located in the input section 4, marking material located in a reservoir 39 near or in a print head or print assembly 31 of the print engine, or finishing resources like staples, paper clips, binding material, etc.

The print head or print assembly 31 is suitable for ejecting and/or fixing marking material to image receiving material and a paper path 34, 32, 35 for transporting the image receiving material from an entry point 36 of the print engine and control section 3 to the inlet 53 of the output section 5. The print head or print assembly 31 is positioned near the paper path section 34. The print head or print assembly 31 may be an inkjet print head, a direct imaging toner assembly or an indirect imaging toner assembly. While an image receiving material is transported along the paper path section 34, the image receiving material receives the marking material through the print head or print assembly 31. A next paper path section 32 is a flip unit for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

When the image receiving material has been printed upon, the image receiving material is transported to the inlet 53 of the output section 5.

The input section 4 may comprise at least one input holder 44, 45, 46 for holding the image receiving material before transporting the sheets of image receiving material to the print engine and control section 3. Sheets of image receiving material are guided from the input holders 44, 45, 46 by guiding means 42, 43, 47 to an outlet 36 for entrance in the print engine and control section 3.

The local user interface 7 is suitable for displaying user interface windows for controlling the print job queue residing in the control unit 37. In another embodiment a computer N1 in the network N has a user interface for displaying and controlling the print job queue of the printing system 1.

Figure 2:
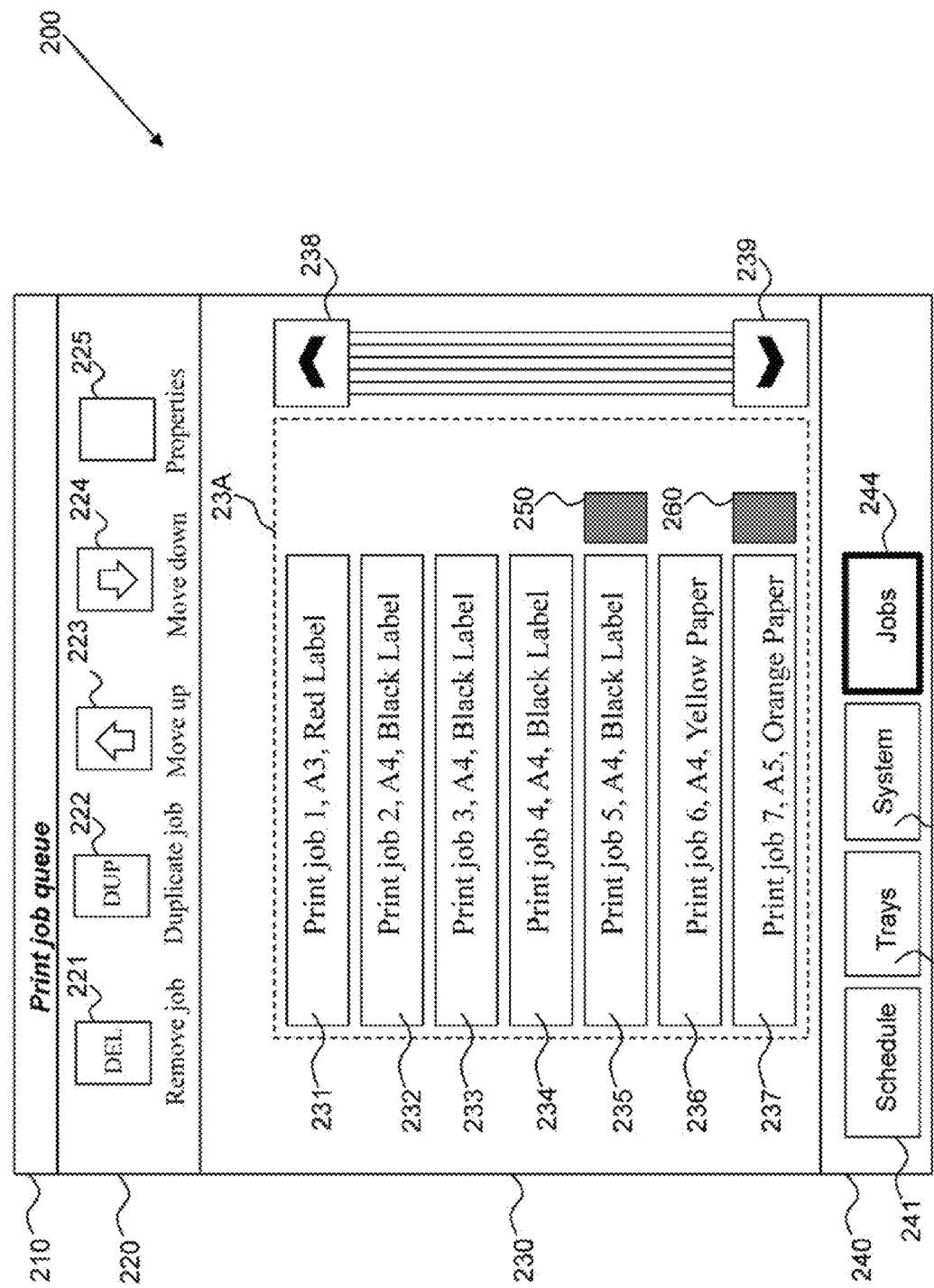
FIGS. 2-6 are schematic views of a print job queue in a user interface window of the printing system according to the invention.

FIG. 2 shows a user interface window 200 of the printing system 1 according to the invention. In an alternative embodiment part of the functionality—like buttons—of this user interface window is designed as hardware buttons near the user interface window 200. The user interface window 200 is opened at the local user interface 7 in FIG. 1 and shows a representation of the print job queue residing in the control unit 37 in FIG. 1.

The user interface window 200 comprises a title section 210, a user action section 220, a print job queue section 230 and a navigation section 240.

The user action section 220 comprises user operable items 221-225 to be selected for executing actions on one or more selected print jobs in the print job queue 23A in the print job queue section 230.

A first user operable item 221 represents a job removal action.

A second user operable item 222 represents a job duplication action.

A third user operable item 223 represents a move up action.

A fourth user operable item 224 represents a move down action.

A fifth user operable item 225 represents an action to retrieve and display properties and settings of a selected print job in a properties window (not shown).

The user action section 220 may additionally comprise a user operable item for creating a proof print job from a selected print job in the print job queue 23A.

The navigation section 240 comprises a first user operable item 241 for navigating to a schedule with a timeline and media needed for the print jobs, a second user operable item 242 for navigating to an overview of the input trays and the content of the input trays, a third user operable item 243 for navigating to the system settings, and a fourth user operable item 244 for navigating to the print jobs in the print job queue 23A. In the user interface window 200 the fourth user operable item 244 is selected.

The print job queue section 230 comprises a representation of the print job queue 23A. The print job queue 23A may be empty or comprises at least one print job. FIG. 2 shows a plurality of print jobs 231-237 in the print job queue 23A in a sequence order from top to bottom. A first print job 231 will be printed real soon after the current print job (not shown) that is currently printed by the printing device is ready. A last print job 237 will be printed if the preceding print jobs 231-236 are ready. Each print job 231-237 in the print job queue 23A is selectable by a mouse or by a finger or stylus in case of a touch screen. A sequence order of the print jobs 231-237 in the print job queue 23A may be changed by selecting a print job in the print job queue 23A and then activating the third user operable item 223 or the fourth user operable item 224 in order to move the selected print job one position up or down respectively in the print job queue 23A. In a further embodiment in case of a touch screen a position of a print job 231-237 in the print job queue 23A may be changed by dragging and dropping the appropriate print job to another position in the print job queue. The print job queue 23A is scrollable by activating an upward scrolling button 238 or a downward scrolling button 239. Each print job 231-237 in the print job queue 23A may be displayed with a number of properties of the print job, such as an identifying name of the print job ("Print job 1"), a size of the image receiving material to be used for the print job ("A3"), the medium type of the image receiving material ("Red Label"), etc. For convenience reasons a small relevant number of properties for each print job 231-237 is displayed in the print job queue 23A.

The print job 235 comprises a plurality of print job settings. One of the print job settings of print job 235 is a proof print job setting that indicates that the print job 235 needs to be proofed before printing. Therefore a digital user operable item 250 according to the invention is visible near the print job 235 in the print job queue 23A. Also the print job 237 needs a proof print. Therefore a digital user operable item 260 according to the invention is visible near the print job 237 in the print job queue 23A. A value of the proof print setting may have been set by a user in a printer driver when submitting the print job 235 to the printing system 1.

The digital user operable item 250 may be made visible upon entrance of the print job 235 near the print job representation of the print job 235 in the print job queue. The digital user operable item 250 may be made visible after entrance of the print job 235 near the print job representation of the print job 235 in the print job queue 23A, but before the print job 235 arrives at the head of the print job queue 23A.

When the user or operator activates the digital user operable item 250 by means of a touch in case of a touch screen or by means of a mouse click otherwise, a proof print job will be created for the print job 235 and scheduled in time before the print job 235 in the print job queue 23A.

Figure 3:
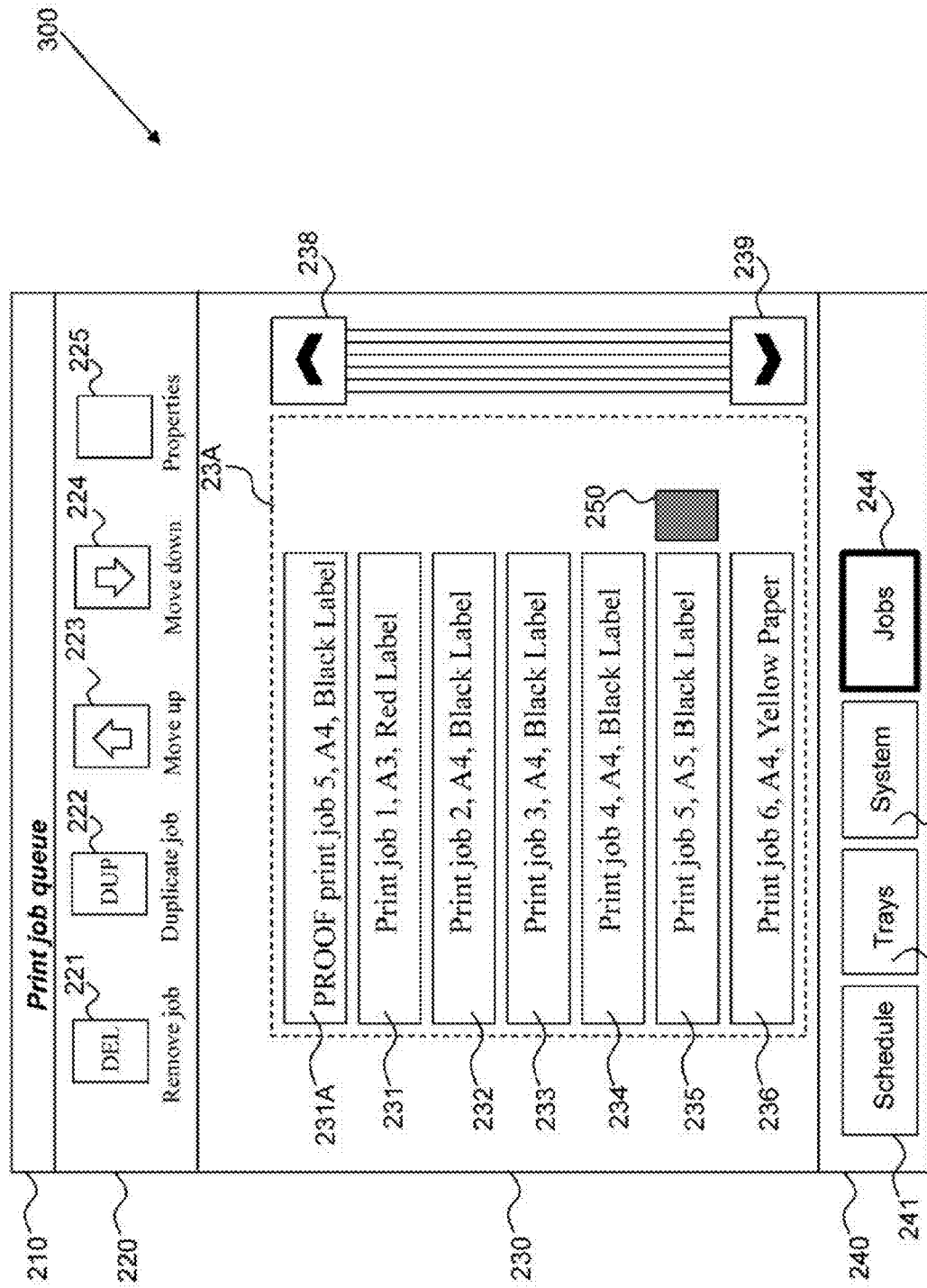
Figure 4:
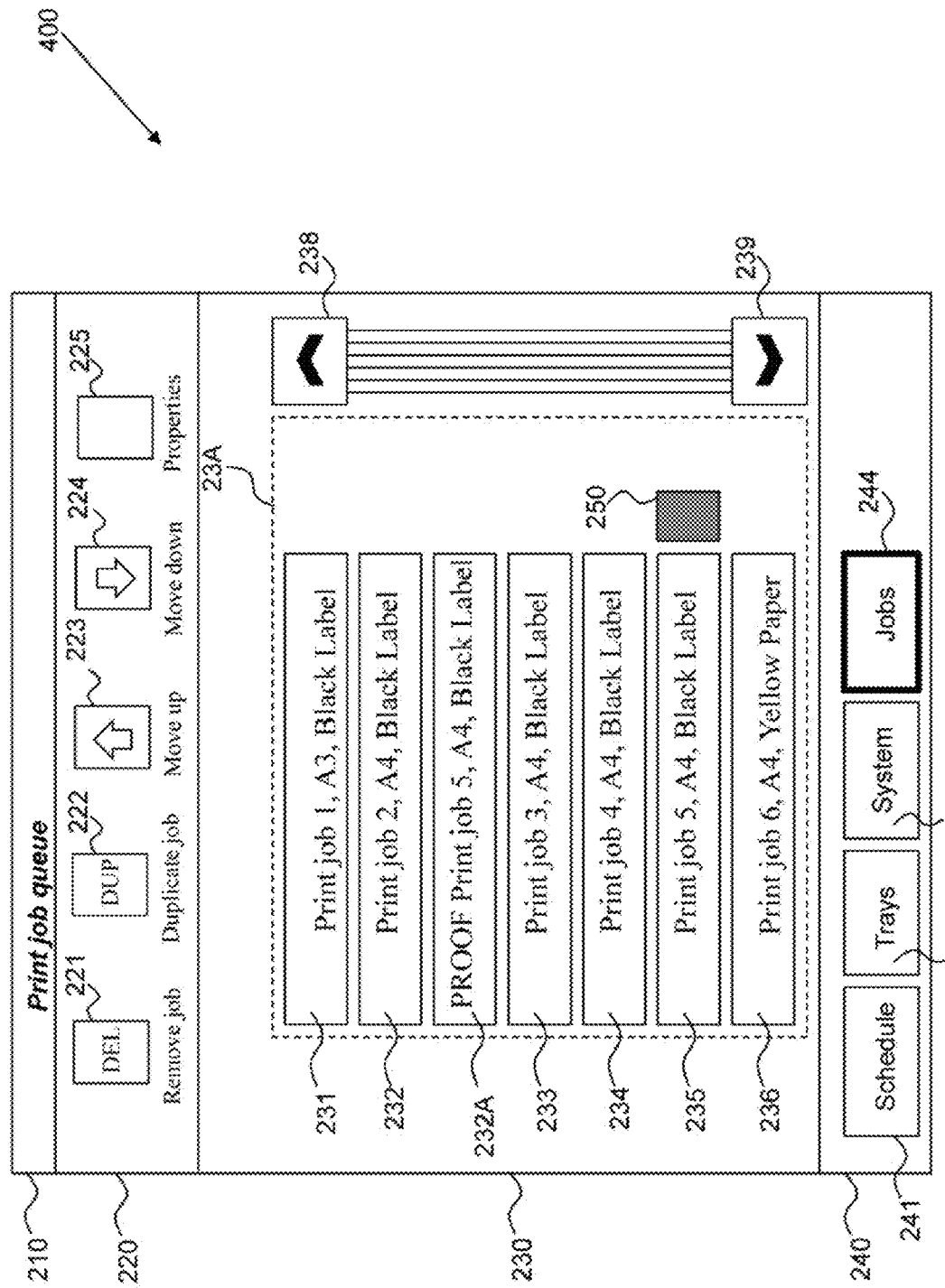

FIG. 3-4 are examples of a user interface window 300-400 of the print job queue 23A in which a proof print job is scheduled according to the invention.

According to a first embodiment shown in FIG. 3 the created proof print job for the print job 235 is scheduled at the head—here the top—of the print job queue 23A.

FIG. 3 shows a user interface window 300 of the printing system 1 according to the invention. In an alternative embodiment part of the functionality—like buttons—of this user interface window is designed as hardware buttons near the user interface window 300.

FIG. 3 shows the user interface window 300 wherein a proof print job corresponding to print job 235 is scheduled at the head of the print job queue 23A at a position 231A.

As soon as the proof print job is scheduled at position 231A the digital user operable item 250 may change at least one of its visual characteristics in order to indicate that a proof print job for the print job 235 is scheduled in the print job queue 23A. For example, the color of the digital user operable item 250 may change from orange full colour to orange dashed. For example, an icon representing the digital user operable item 250 may change, a label text of the digital user operable item 250 may change or a visual styling of the digital user operable item 250 may change.

According to a second embodiment shown in FIG. 4 the created proof print job for the print job 235 is scheduled at a moment in time that is accordance with a print job criterion at a position 232A in the print job queue 23A. In this case the print job criterion is the size A4 of the sheets for the print job 235. Since print jobs 232-234 also have the size A4, the proof print job may be scheduled at the position 232A in order to be in accordance with the print job criterion of the same size. This is advantageous since such a scheduling will not lead to any additional media change event due to the insertion of the proof print job in the print job queue 23A. This is extra advantageous if such a media change event leads to a necessary purging step or a necessary print head adjustment.

FIG. 4 shows a user interface window 400 of the printing system 1 according to the invention. In an alternative embodiment part of the functionality—like buttons—of this user interface window is designed as hardware buttons near the user interface window 400.

As soon as the proof print job is scheduled at position 232A the digital user operable item 250 may change one of its visual characteristics in order to indicate that a proof print job for the print job 235 is scheduled in the print job queue 23A. For example, the color of the digital user operable item 250 may change from orange full colour to orange dashed. For example, an icon representing the digital user operable item 250 may change, a label text of the digital user operable item 250 may change or a visual styling of the digital user operable item 250 may change.

According to a third embodiment (not shown) the created proof print job for the print job 235 is scheduled at a moment in time that is accordance with a touch or mouse click at a position in the print job queue 23A between the position of the print job 235 and the head of the print job queue 23A. For example, the user may activate the digital user operable item 250 and may have the opportunity to click or touch the wished position in the print job queue 23A within a predetermined time period directly after the activation of the digital user operable item 250. The proof print job is then scheduled at the touched position in the print job queue 23A.

As soon as the proof print job is going to be printed—according to the first, the second and the third embodiment—a visual characteristic of the digital user operable item 250 may change. For example, the visibility frequency may change, i.e. the digital user operable item 250 is going to flicker, to vibrate or to pulsate. For example, an icon representing the digital user operable item 250 may change, a label text of the digital user operable item 250 may change or a visual styling of the digital user operable item 250 may change.

In the time period between the scheduling of the print job 235 in the print job queue 23A and the actual printing of the print job 235—according to the first, the second and the third embodiment—at least one visual characteristic of the digital user operable item 250 may gradually change in order to indicate that a time left for proofing the print job is lapsing. For example a color of the digital user operable item 250 may gradually change from orange to red. For example, a clock/counter visualisation may be applied to the digital user operable item 250, a time progress bar may be applied to the digital user operable item 250 or a (text based) countdown timer may be applied to the digital user operable item 250.

Figure 5:
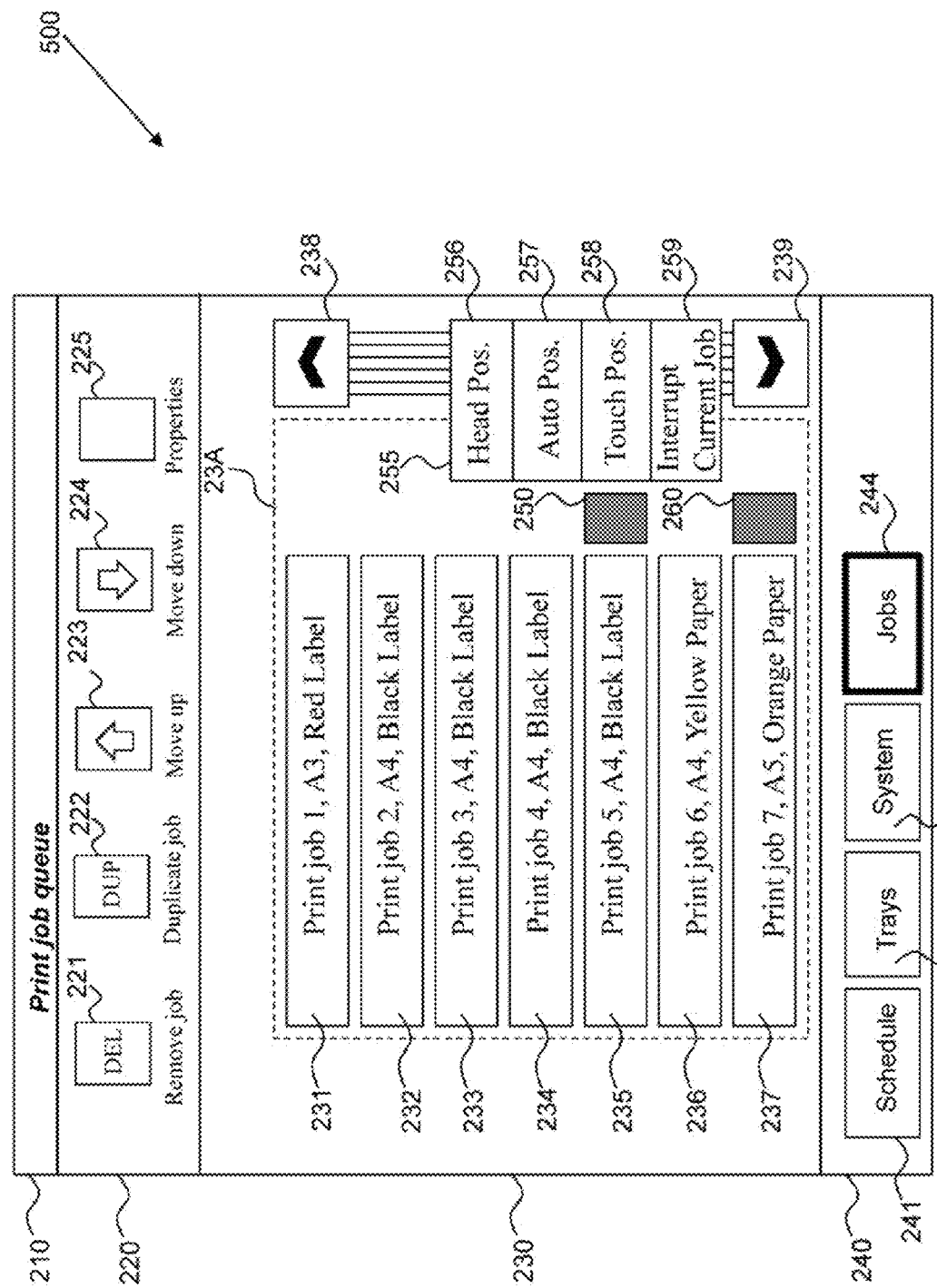

According to another embodiment—shown in a user interface window 500 in FIG. 5—a menu 255 is displayed, upon activation of the digital user operable item 250, in the user interface window 500 near the digital user operable item 250. The menu 255 comprises options 256-259 for adding the proof print job to the print job queue 23A.

The first option 256 titled "Head Pos." is the insertion of the proof print job at the head of the print job queue 23A according to the first embodiment described here-above and shown in FIG. 3.

The second option 257 titled "Auto Pos." is the insertion of the proof print job according to a print job criterion for the print job queue 23A according to the second embodiment described here-above and shown in FIG. 4.

The third option 258 titled "Touch Pos." is the insertion of the proof print job by means of a touch or mouse click of the user or operator in the print job queue 23A according to the third embodiment described here-above.

When the first option 256, the second option 257 or the third option 258 is selected from the menu 255, the proof print job for print job 235 will be inserted in the print job queue 23A accordingly.

The fourth option 259 titled "Interrupt Current Job" is the insertion of the proof print job in the current print job. The current print job is interrupted at a set or record boundary of the current print job, or even inside a current set of the current print job, leading to a faster proof output. In the case that the proof print job is going to be output in a separate output location of the printing system, the proof print job will be simply retrieved from the separate output location and can be printed while the current print job is busy printing.

Figure 6:
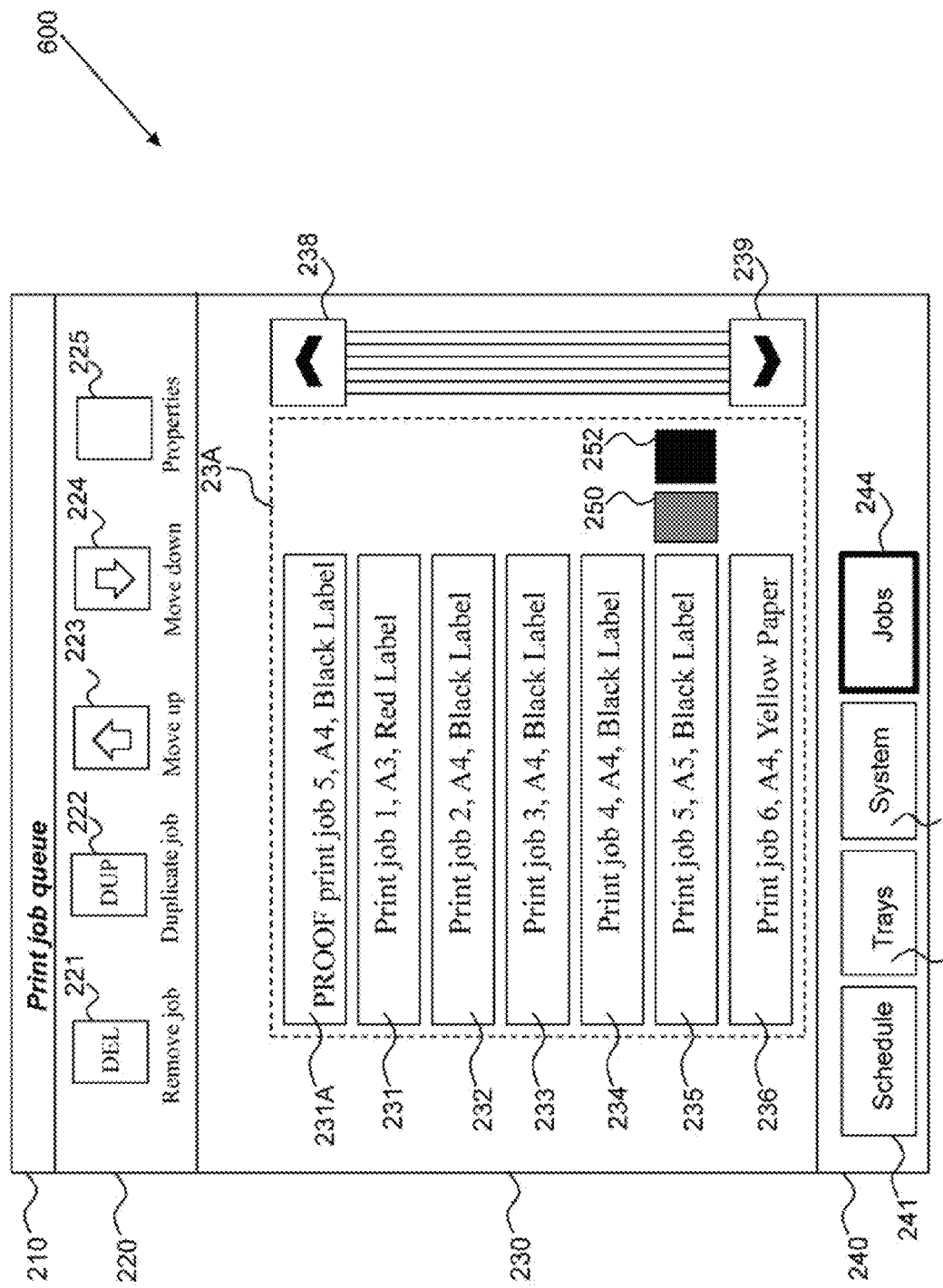

According to an embodiment a second digital user operable item 252 corresponding to the print job 235 is displayed as shown in FIG. 6 on a user interface window 500. The second digital user operable item 252 is suitable for approving of the proof print job corresponding to the print job 235 when the proof print job is printed and checked. According to an embodiment the second digital user operable item 252 appears on the window 500 upon the scheduling of the proof print job in the print job queue 23A. According to another embodiment the second digital user operable item 252 appears on the window 500 after the scheduled proof print job is printed and disappeared from the print job queue 23A.

The user or operator may approve the proof print job by activating the second digital user operable item 252. According to an embodiment a visual characteristic of the second digital user operable item 252 changes—for example the color of the second digital user operable item 252 becomes green—upon activation of the second digital user operable item 252. According to another embodiment, upon activation of the second digital user operable item 252, the second digital user operable item 252 disappears from the user interface window 500 and a visual characteristic of the digital user operable item 250 changes. For example the color of the digital user operable item 250 becomes green.

According to an alternative embodiment the second digital user operable item is located inside a submenu 225 of the print job properties of the selected print job as shown in the user interface window 500.

When the user or operator has checked and approved the proof print job by means of the second user operable item 252, the print job 235 is printed according to print job queue 23A when the print job 235 arrives at the head of the print job queue 23A.

When the digital user operable item 250 is not activated before the print job 235 arrives at the head of the print job queue 23A, the print job 235 is moved to another print job queue and/or removed from the print job queue 23A.

When the second digital user operable item 252 is not activated before the print job 235 arrives at the head of the print job queue 23A, the print job 235 is moved to another print job queue and/or removed from the print job queue 23A.

According to an embodiment the amount of time of checking and approving the proof print job is taken into account when scheduling the proof print job before the corresponding print job in the print job queue 23A. For example, the amount of time between the printing of the proof print job and the printing of the corresponding print job may taken large enough to check and approve the proof print job. The amount of time of checking and approving the proof print job may be derived from the print job settings of the proof print job or from the print job settings of the corresponding print job or from input of an amount of time by the operator or user. Such an input may be entered by means of a digital entry box which is displayed at the user interface window upon activation of the digital user operable item 250.

According to an embodiment the digital user operable item and the second digital user operable item are combined into one digital user operable item, wherein the here-above described functionality of the digital user operable item and the second digital user operable item are distinguishable in the one digital user operable item by means of a difference in at least one characteristic of the one digital user operable item. For example, a difference in shape or size of the one digital user operable item may be implemented.

According to an embodiment the user interface comprises a digital user operable item for printing immediately proof prints for all print jobs scheduled in the print job queue which have a positive proof print job setting. In case of a plurality of proof print jobs each proof print job of the plurality may be accompanied by an identifying sheet to be printed along with the proof print job.

The skilled person will recognise that other embodiments are possible within the scope of the appended claims.

The invention claimed is:

1. A printing system comprising:
   a controller, wherein the controller:
   permits a user to submit a print job to the printing system, the print job comprising a plurality of print job settings comprising a proof print job setting indicating whether or not the print job needs to be proofed before printing;
   controls a print job queue for print jobs submitted to the printing system and scheduled to printed;
   checks the proof print job setting of a print job to be scheduled or already scheduled in the print job queue, to schedule, upon a positive check, a proof print job corresponding to the print job in the print job queue before the print job, and to print the proof print job according to the print job queue before the processing of the print job; and
   executes the proof print job without interrupting the print job when the print job is currently being processed,
   wherein the printing system comprises a user interface configured to display the print job queue,
   wherein the user interface is configured to display a digital user operable item near a print job in the print job queue, if the print job has a proof print job setting indicating that the print job needs to be proofed before printing, and
   wherein the controller is configured to schedule a proof print job corresponding to the print job in the print job queue before the print job upon activation of the digital user operable item.

2. The printing system according to claim 1, wherein the user interface is configured to display the digital user operable item upon entry of the print job in the print job queue.

3. The printing system according to claim 1, wherein, upon activation of the digital user operable item, the proof print job is scheduled at the head of the print job queue so that the proof print job is immediately printed if there is no current print job or is printed immediately after a current print job.

4. The printing system according to claim 1, wherein the controller is configured to detect a touch or mouse click at a position on the user interface after activation of the digital user operable item, the position being a position in a representation of the print job queue on the user interface, and, upon the touch or the mouse click, to schedule the print job in the print job queue corresponding to the touched position.

5. The printing system according to claim 1, wherein the controller is configured to move the print job to a proof print job queue and/or to remove the print job from the print job queue when the print job arrives at the head of the print job queue, which print job comprises a proof print job setting indicating that the print job needs to be proofed before printing and the digital user operable item corresponding to the print job is not activated at the user interface before arrival of the print job at the head of the print job queue.

6. The printing system according to claim 1, wherein the controller is configured to display, upon activation of the digital user operable item, a menu of options of how and where to add the proof print job to the print job queue.

7. The printing system according to claim 1, wherein the user interface is configured to display another digital user operable item corresponding to a print job in the print job queue which needs to be proofed, the other digital user operable item being suitable for approving of a printed proof print job corresponding to the print job upon activation of the other digital user operable item, and the controller is configured to print the print job according to the print job queue, when the other digital user operable item is activated before the print job arrives at the head of the print job queue.

8. The printing system according to claim 7, wherein the controller is configured to move the print job to a proof print job queue and/or to remove the print job from the print job queue, when the other digital user operable item is not activated before the print job arrives at the head of the print job queue.

9. A method for printing a print job by means of a printing system comprising a controller configured to control a print job queue and a user interface for displaying the print job queue, the print job comprising a plurality of print job settings comprising a proof print job setting indicating whether or not the print job needs to be proofed before printing, the method comprising the steps of:
   receiving the print job in the print job queue;
   checking the proof print setting of the print job;
   upon a positive check, scheduling a proof print job corresponding to the print job in the print job queue before the print job;
   printing the proof print job according to the print job queue before processing of the print job and without interrupting the print job,
   displaying the print job queue;
   displaying a digital user operable item near a print job at the displayed print job queue, if the print job has a proof print job setting indicating that the print job needs to be proofed before printing; and
   scheduling the proof print job corresponding to the print job in the print job queue before the print job upon activation of the digital user operable item.

10. The method according to claim 9, wherein the method comprises the step of, upon activation of the digital user operable item, scheduling the proof print job at the head of the print job queue so that the proof print job is immediately printed if there is no current print job or is printed immediately after a current print job.

11. The method according to claim 9, wherein the method comprises the step of displaying, upon activation of the digital user operable item, a menu of options of how and where to add the proof print job to the print job queue.

12. The method according to claim 9, wherein the print job queue is ordered according to at least one print job criterion and the method comprises the step of scheduling the proof print job at a moment in time that is in accordance with the at least one print job criterion.

13. The method according to claim 9, wherein the method comprises the step of displaying another digital user operable item corresponding to a print job in the print job queue which needs to be proofed, the other digital user operable item being suitable for approving of a printed proof print job corresponding to the print job upon activation of the other digital user operable item, and printing the print job according to the print job queue, when the other digital user operable item is activated before the print job arrives at the head of the print job queue.

14. A non-transitory recording medium comprising computer executable program code configured to instruct a computer to perform the method according to claim 9.

* * * * *